(12) United States Patent
Trivini

(10) Patent No.: US 8,567,010 B2
(45) Date of Patent: Oct. 29, 2013

(54) WHEEL CONSTRUCTION INCLUDING A LOCKING DEVICE

(75) Inventor: Ruggero Trivini, Sant'Angelo Lodigiano (IT)

(73) Assignee: O.G.T.M. Officine Meccaniche S.R.L., Sant'Angelo Lodigiano (LO) (IT)

(*) Notice: Subject to any disclaimer, the term of this patent is extended or adjusted under 35 U.S.C. 154(b) by 53 days.

(21) Appl. No.: 13/151,546

(22) Filed: Jun. 2, 2011

(65) Prior Publication Data

US 2012/0019049 A1    Jan. 26, 2012

(30) Foreign Application Priority Data

Jul. 23, 2010    (IT) ............................. MI2010A1366

(51) Int. Cl.
*B60B 33/00* (2006.01)

(52) U.S. Cl.
USPC ........................................ 16/35 R; 188/1.12

(58) Field of Classification Search
USPC ...... 16/35 R, 35 D, 18 R, 45, 31 R; 188/1.12, 188/69; 301/6.1
See application file for complete search history.

(56) References Cited

U.S. PATENT DOCUMENTS

| | | | | |
|---|---|---|---|---|
| 4,333,207 A * | 6/1982 | Atwood | ........................ | 16/35 R |
| 5,368,133 A * | 11/1994 | Yang | ........................... | 188/1.12 |
| 5,450,650 A * | 9/1995 | Bertrand et al. | ............. | 16/35 R |
| 5,607,030 A * | 3/1997 | Swift et al. | ................... | 188/1.12 |
| 6,839,938 B2 * | 1/2005 | Kausemann | .................. | 16/35 R |
| 7,861,370 B2 * | 1/2011 | Chu | ............................. | 16/35 R |
| 7,866,453 B2 * | 1/2011 | Wu | .............................. | 190/18 A |
| 8,181,310 B2 * | 5/2012 | Schulte | ........................ | 16/35 R |

* cited by examiner

*Primary Examiner* — William Miller
(74) *Attorney, Agent, or Firm* — Hedman & Costigan, P.C.; James V. Costigan; Kathleen A. Costigan

(57) ABSTRACT

A wheel construction including a locking device, characterized in that said wheel construction comprises a box-like body of a substantially prismatic configuration and opened at least at a bottom portion thereof, in said box-like body being snap arranged a fork element cooperating with a lever element for locking a rotary movement of a wheel.

5 Claims, 6 Drawing Sheets

WHEEL CONSTRUCTION INCLUDING A LOCKING DEVICE

BACKGROUND OF THE INVENTION

The present invention relates to a wheel construction including a locking device.

Wheel constructions, such as castor wheels and the like, including a locking and unlocking device for unlocking the wheel rotary movement, which device usually comprises a pedal lever operating on the wheel by different interference or friction means, are already known.

The above braked wheels have a number of applications and the need of making reliable and economic wheels is constantly increasing.

SUMMARY OF THE INVENTION

Accordingly, the aim of the present invention is to provide a wheel construction having improved operating and safety characteristics while being very simple from a structural standpoint.

Within the scope of the above mentioned aim, a main object of the invention is to provide such a wheel construction including a very small number of components all of which may be easily made and assembled.

Another object of the present invention is to provide such a wheel construction of easy and self-evident use.

Yet another object of the present invention is to provide such a wheel construction which, owing to its specifically designed structural features, is very reliable and safe in operation.

According to one aspect of the present invention, the above mentioned aim and objects, as well as yet other objects, which will become more apparent hereinafter, are achieved by a wheel construction including a locking device, characterized in that said wheel construction comprises a box-like body of a substantially prismatic configuration and opened at least at a bottom portion thereof, in said box-like body being snap arranged a fork element cooperating with a lever element for locking a rotary movement of a wheel.

Said fork element comprises two side leg elements, coupled to one another by a top cross member, and arranged along the inner surfaces of the side walls of said box-like body, said leg elements having inward facing tooth arrangements for engaging two ring gear members formed on the sides of the wheel.

BRIEF DESCRIPTION OF THE DRAWINGS

Further characteristics and advantages of the present invention will become more apparent hereinafter from the following detailed disclosure of a preferred, though not exclusive, embodiment of the invention, which is illustrated, by way of an indicative, but not limitative, example in the accompanying drawings, where.

DESCRIPTION OF THE PREFERRED EMBODIMENTS

Figure 1:
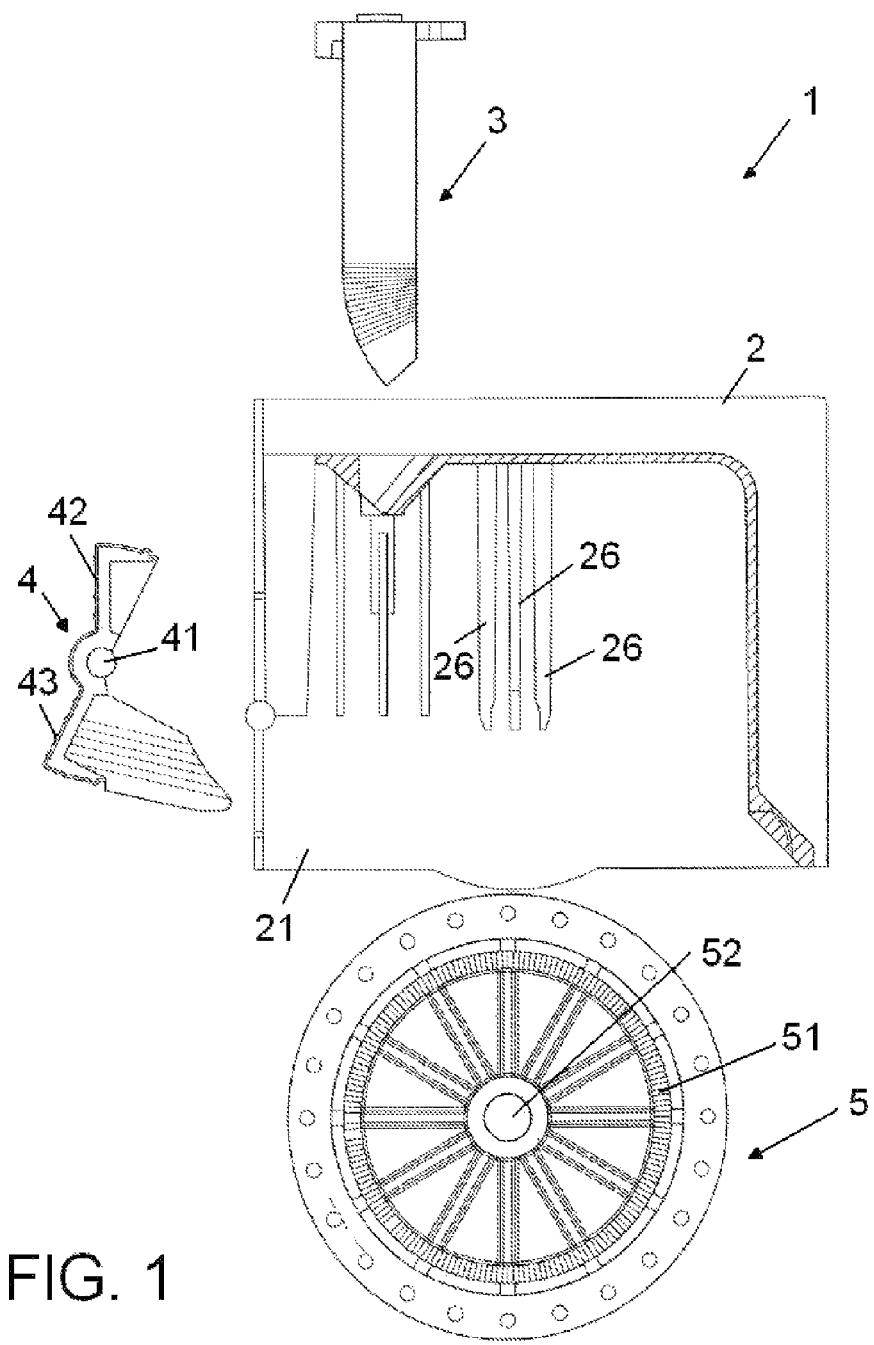
FIG. 1 is an exploded side elevation view of the wheel construction including a locking device according to the present invention.
Figure 2:
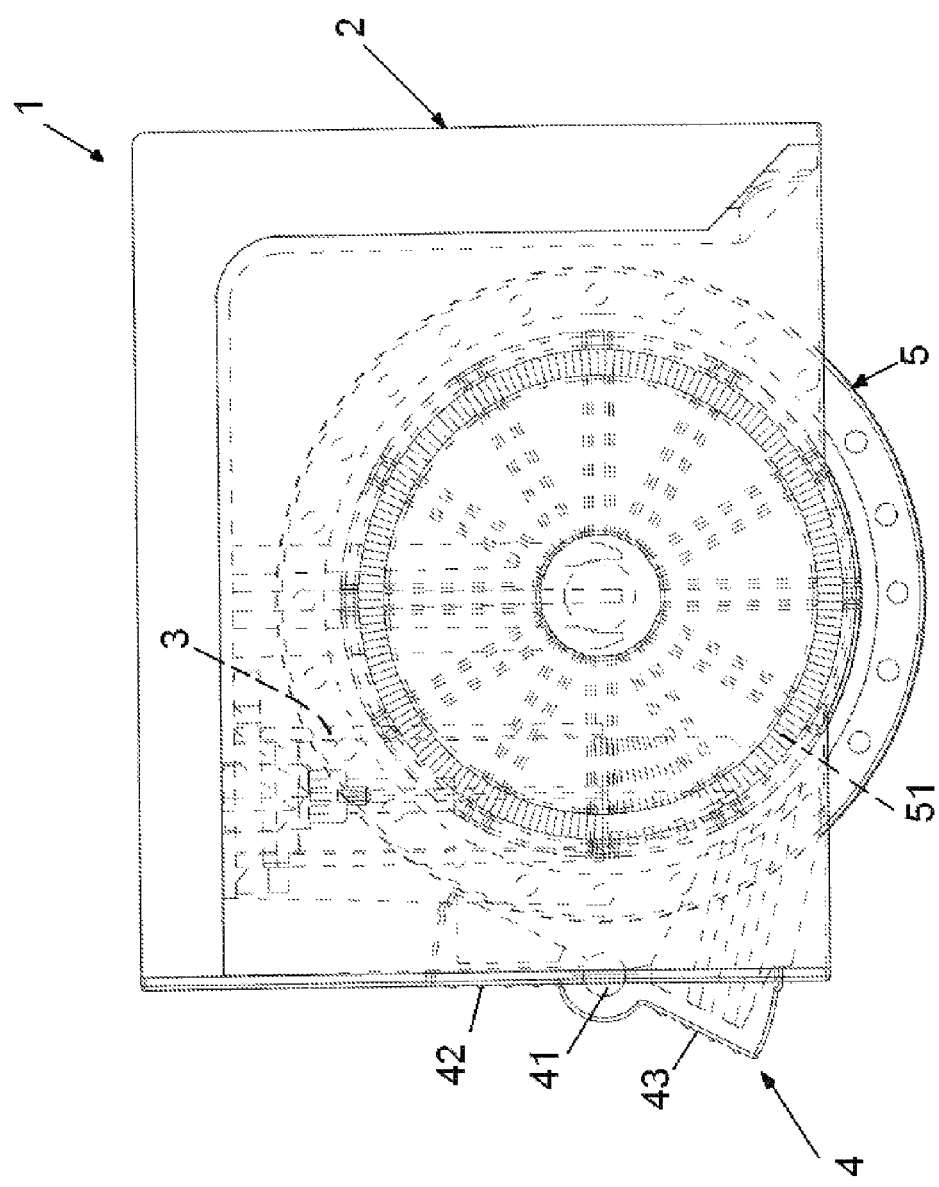
FIG. 2 is a see-through or ghost side elevation view of the wheel construction according to the present invention as seen in an assembled condition thereof.
Figure 3:
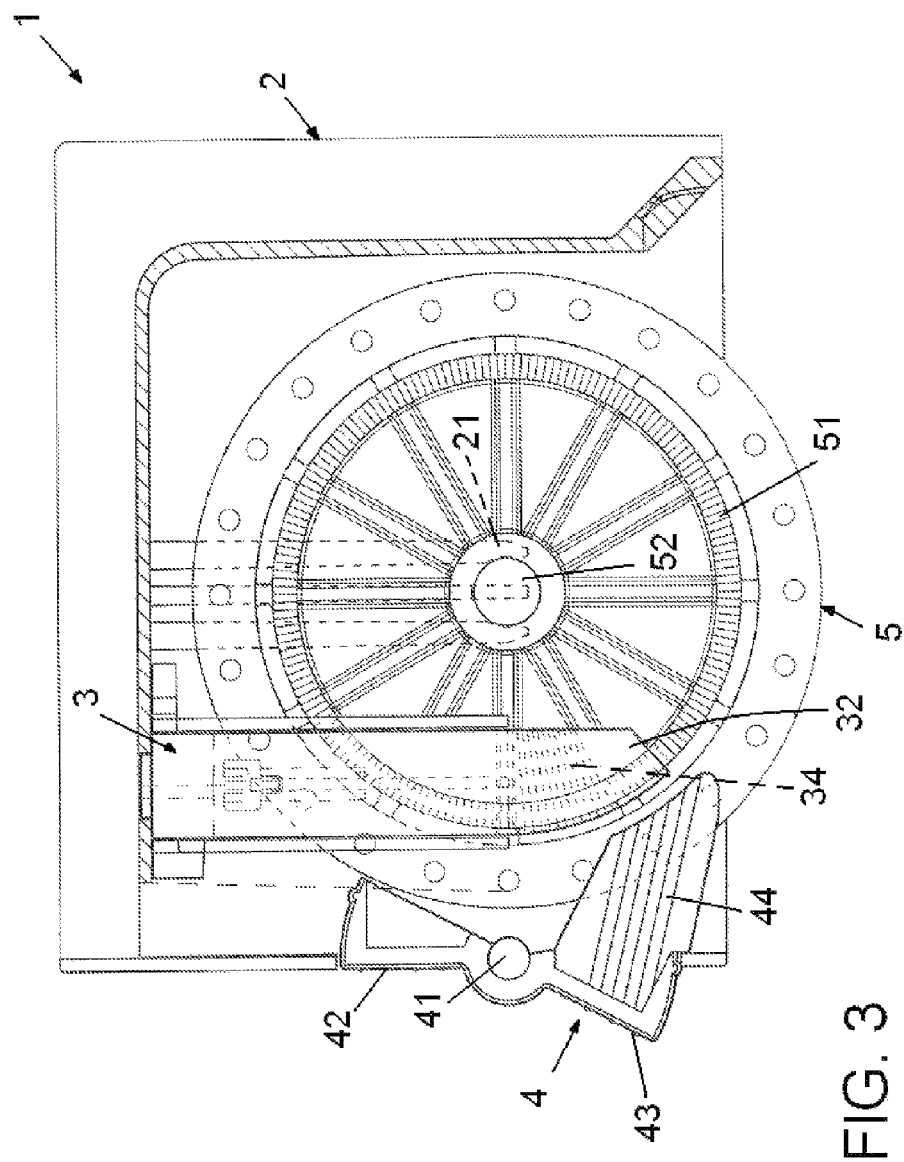
FIG. 3 is a partially broken-away side elevation view showing the wheel construction in an unlocked position thereof.
Figure 4:
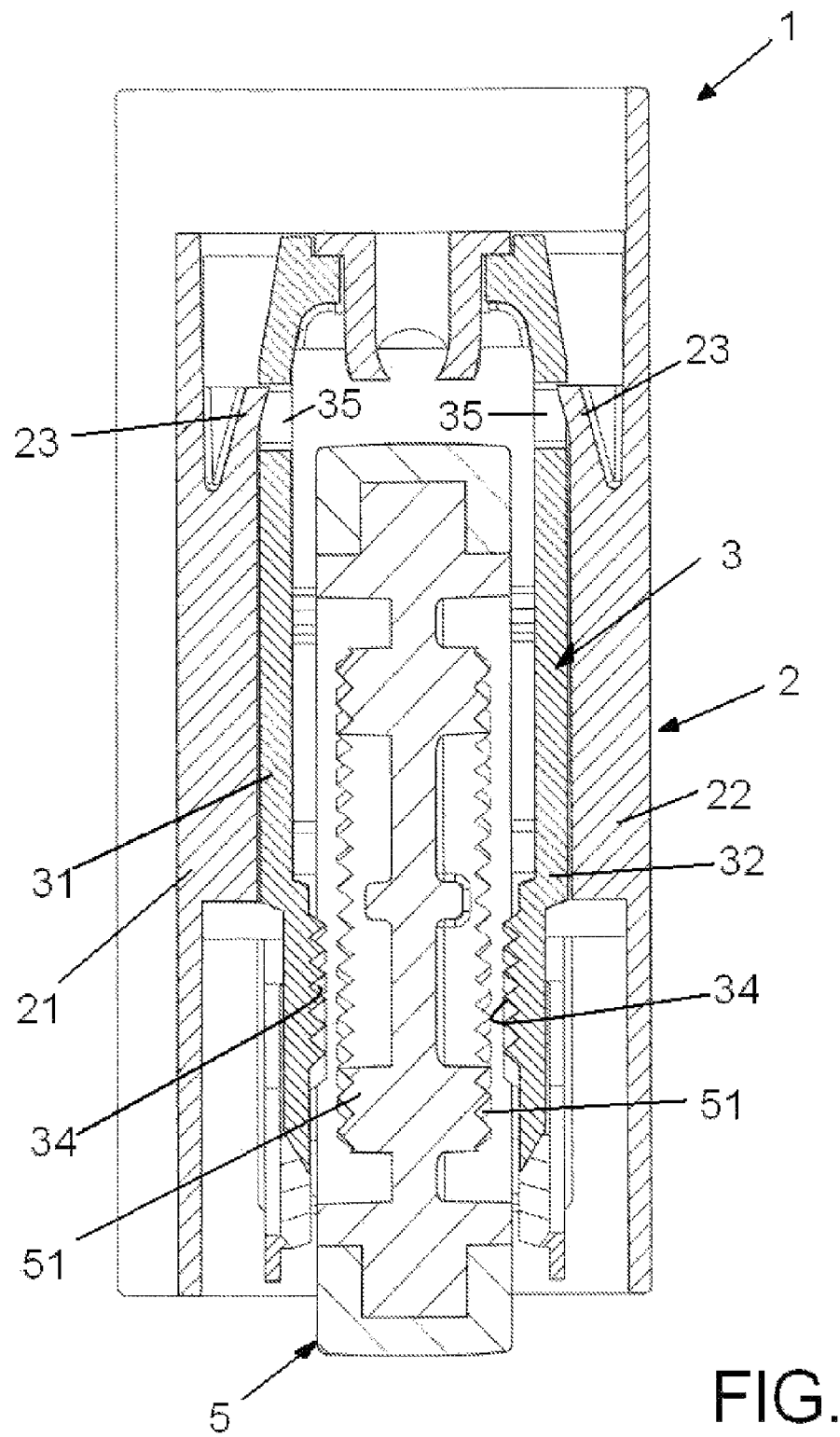
FIG. 4 is a front cross-sectional view showing the subject wheel construction in an unlocked position.

With reference to the number references of the above mentioned figures, the wheel construction including a locking device according to the present invention, which has been generally indicated by the reference number 1, comprises a box-like body 2 having a substantially prismatic configuration and being opened at least at a bottom portion thereof.

Inside said box-like body 2 being snap arranged a fork element 3 cooperating with a lever element 4 for locking a rotary movement of a wheel 5.

Said fork element 3 comprises two side leg elements 31 and 32 coupled to one another by a top cross member 33, and arranged along the inner surfaces of the side walls 21 and 22 of said box-like body 2.

Both said leg elements 31 and 32 having inward facing tooth arrangements 34 for engaging two ring gear members 51 formed on the sides of the wheel 5.

The fork element 3 is snap engaged in said box-like body 2 by snap engaging notches 35 for engaging respective tooth elements 23 formed in said box-like body at a top portion thereof.

Said snap engagement of said fork element 3 being made possible owing to a resilient deformation of said leg elements 31 and 32.

Said lever element 4 is pivoted to said box-like body 2 by pivot pins 41 and includes a first push-button portion 42 and a second push-button portion 43, said first and second push-button portions being slightly inclined with respect to one another.

At said second push-button portion 43 being formed two position defining flaps 44 which define with respect to said wheel: a first unlocking position, thereat said flaps 44 are remotely arranged from said fork element 3 legs 31 and 32, and a second locking position thereat said flaps 44 are arranged between the inner walls of the box-like body 2 and said fork element 3 legs 31 and 32.

Figure 5:
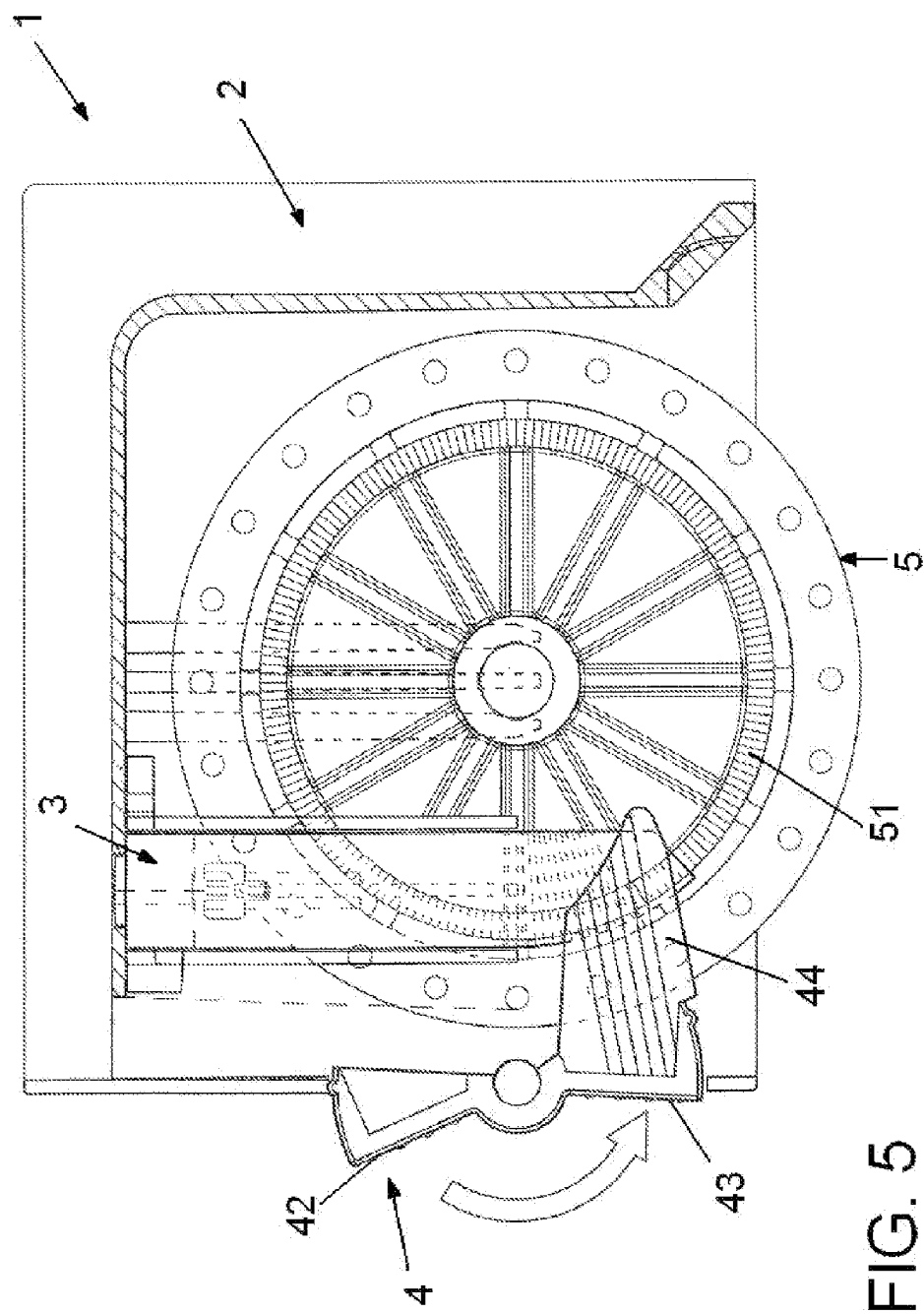
FIG. 5 is a partially broken-away side elevation view showing the wheel construction in a locked position thereof.
Figure 6:
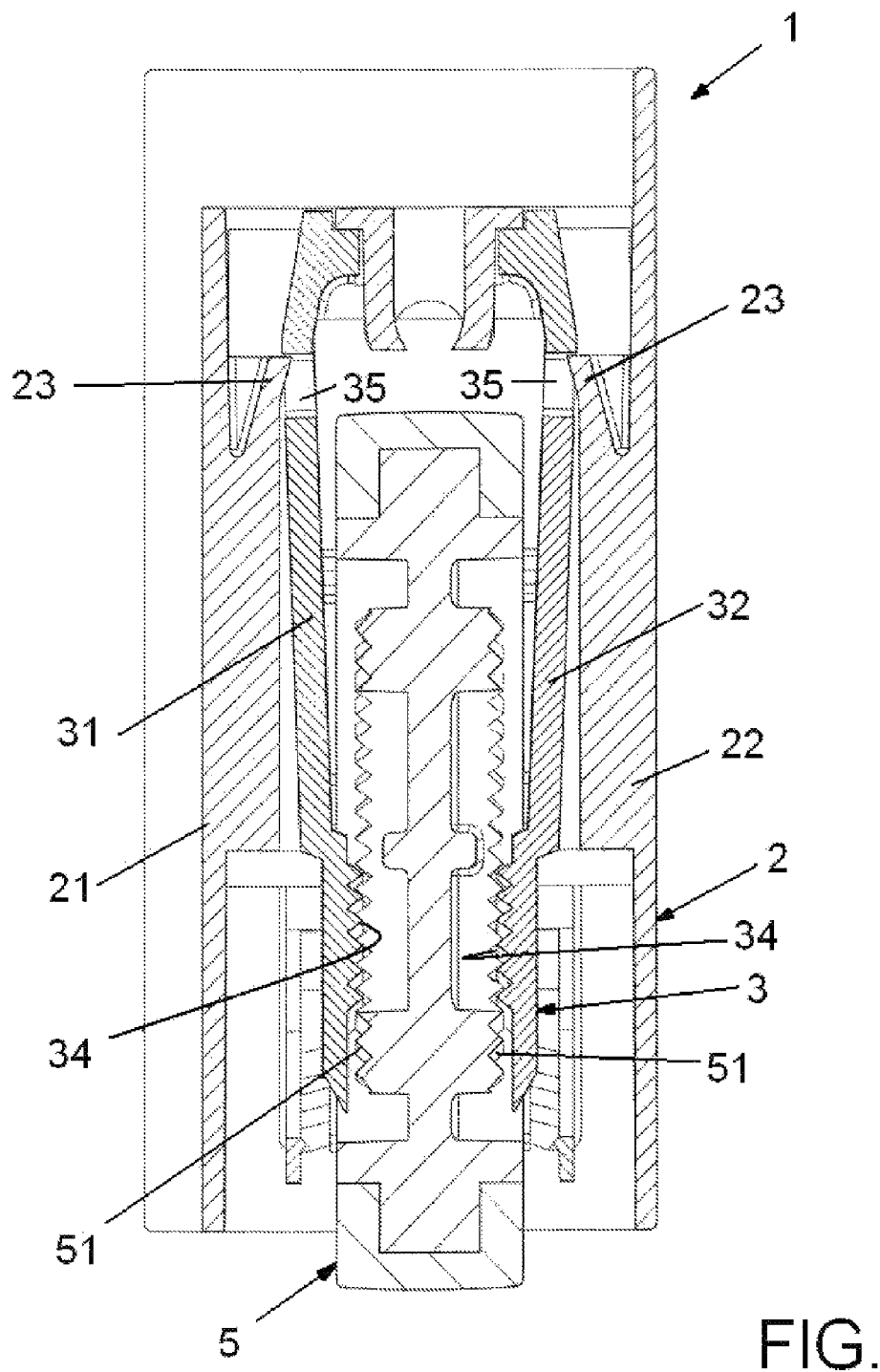
FIG. 6 is a front cross-sectional view showing the wheel construction in a locked position thereof.

In said locking position, as shown in FIGS. 5 and 6, said flaps 44 urge the fork element legs 31 and against said wheel 5 thereby causing the tooth arrangements 34 of said legs to engage the two ring gear elements 51 formed on the sides of said wheel 5.

The locking and unlocking positions of the lever element 4 are actuated by simply pressing on said push-button portions, respectively 43 and 42, of said lever element 4.

The assembling of the wheel construction is very quick and easy, since it is sufficient to snap engage the fork element 3 in said box-like body 2, as above disclosed, and then connect said wheel 5 by causing said wheel pivot pins 52 to be engaged in recesses 25 formed on the inner sides of said box-like body 2.

The recesses 25 are formed at the end portions of rib patterns 26 formed on the walls 21 and 22 of the box-like body 2.

Finally, the lever element 4 is applied by using said pivot pins 41 engaging in suitable recesses or seats formed in the box-like body.

It has been found that the invention fully achieves the intended aim and objects.

In fact, the invention has provided a wheel construction including a locking and unlocking device, which wheel construction comprises a very small number of component pieces all of which may be quickly and easily assembled without using assembling tools.

In practicing the invention, the used materials, as well as the contingent size and shapes, can be any, depending on requirements.

The invention claimed is:

1. A wheel construction including a locking device, said wheel construction comprising a prismatic box body opened at least at a bottom portion thereof, and having snap arranged in said box body, a fork element cooperating with a lever element for locking a rotary movement of a wheel, said fork element comprising two side leg elements, coupled to one another by a top cross member, and arranged along inner surfaces of side walls of said box body, said side leg elements having inward facing tooth arrangements for engaging two ring gear members formed on corresponding sides of the wheel construction characterized in that said fork element is snap engaged in said box body by snap engaging notches which engage respective tooth elements formed at a top portion within said box body, said snap engagement of said fork element being made via a resilient deformation of said side leg elements.

2. A wheel construction, according to claim 1, characterized in that said lever element is pivoted to said box body by pivot pins and includes a first push-button portion and a second push-button portion, said first and second push-button portions being slightly inclined with respect to one another, and having at said second push-button portion two position defining flaps which define, with respect to said wheel, a first unlocking position where said two position defining flaps are remotely arranged from the side leg elements and a second locking position where said two position defining flaps are arranged between the inner side surfaces of said box body and said side element legs, and in said second locking position said two position defining flaps urge the side element legs against said wheel thereby causing the tooth arrangements of said side element legs to engage the two ring gear elements formed on the wheel.

3. A wheel construction, according to claim 2, characterized in that said first unlocking and said second locking positions are actuated by pressing on said push-button portions of said lever element.

4. A wheel construction, according to claim 1, characterized in that said wheel construction is assembled by snap engaging the fork element in said box body and then assembling said wheel by causing wheel pivot pins to be engaged in recesses formed on said inner surfaces of side walls of said box body, the lever element being then applied by engaging said pivot pins in seats formed in said box body.

5. A wheel construction, according to claim 4, characterized in that said recesses are formed at end portions of rib patterns formed on the side walls of said box body.

* * * * *